United States Patent [19]

Bormioli

[11] Patent Number: 4,501,294

[45] Date of Patent: Feb. 26, 1985

[54] SEQUENTIAL OPERATION DEVICE FOR CONTROLLED MEMBERS

[76] Inventor: Giorgio Bormioli, Via Galileo Galilei, 11, 35100 Padova, Italy

[21] Appl. No.: 439,036

[22] Filed: Nov. 4, 1982

[30] Foreign Application Priority Data

Jan. 18, 1982 [IT] Italy ............................ 19153 A/82

[51] Int. Cl.³ ............................................. G05G 9/08
[52] U.S. Cl. ............................. 137/614.11; 74/480 R; 92/68; 137/595
[58] Field of Search ................... 74/480 R; 192/3 M; 92/68; 137/595, 614.11

[56] References Cited

U.S. PATENT DOCUMENTS

| | | | |
|---|---|---|---|
| 1,817,416 | 8/1931 | Lippert | 74/480 X |
| 2,030,753 | 2/1936 | McDonnell | 74/480 X |
| 2,604,962 | 7/1952 | Tibbetts | 192/3 M |
| 2,831,555 | 4/1958 | Strauss | 192/3 M |
| 3,750,780 | 8/1973 | Danek | 192/3 M |

Primary Examiner—Allan D. Herrmann
Attorney, Agent, or Firm—Shlesinger, Fitzsimmons & Shlesinger

[57] ABSTRACT

An operation member can be driven to move along a rectilinear path, which is perpendicular and laterally positioned with respect to a rotating control shaft of a first controlled member and directed towards a control element of a second controlled member. There are provided movement transmission means provided with clearance, which firstly transform an initial advancement of the operation member into a rotation of said rotating shaft and then, while maintaining stationary the same shaft, allow said operation member a final advancement up to the operation engagement with said control element.

6 Claims, 10 Drawing Figures

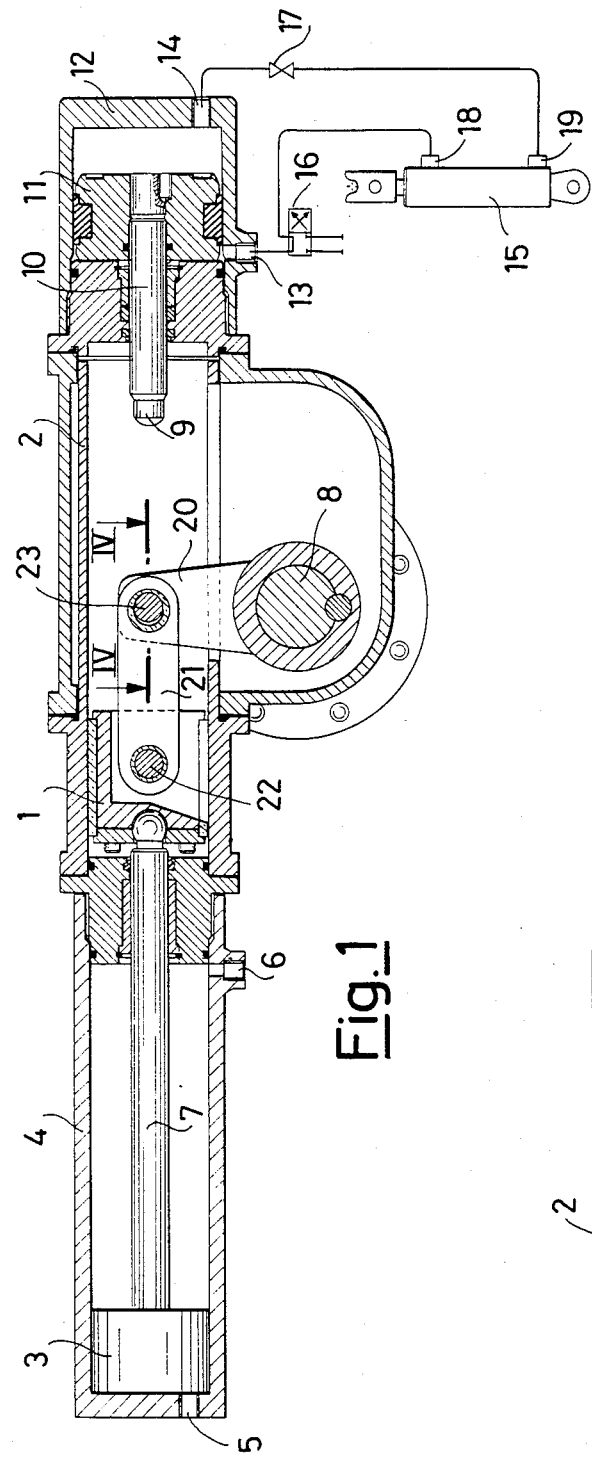
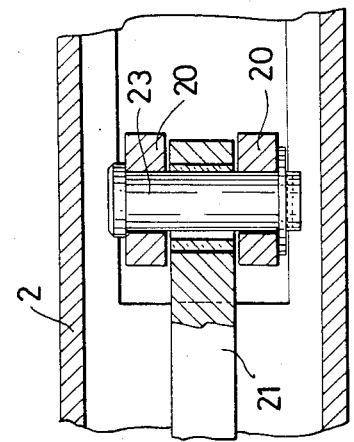
Fig. 1
Fig. 4

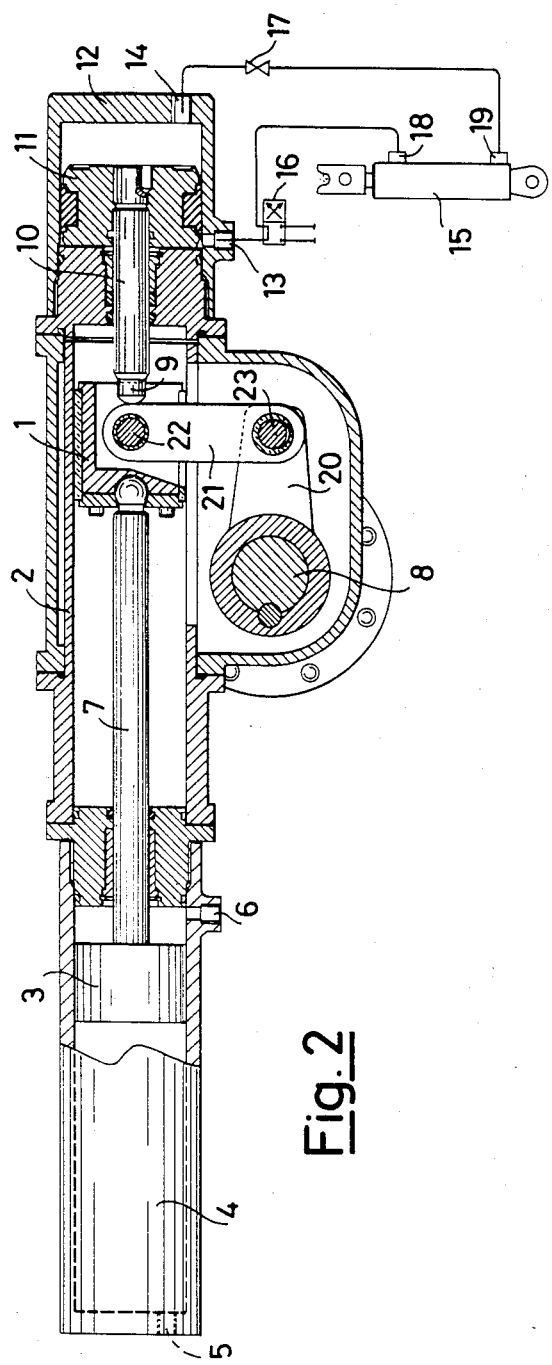
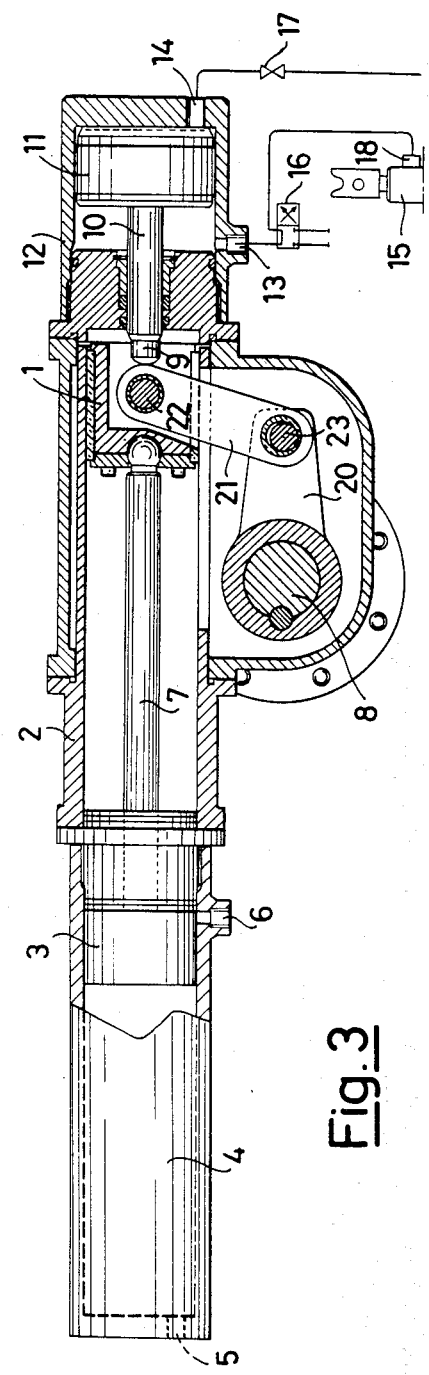
Fig.2
Fig.3

SEQUENTIAL OPERATION DEVICE FOR CONTROLLED MEMBERS

The present invention relates to a sequential operation device for controlled members.

There are many apparatus in which two or more controlled members must be operated in a very exact sequence to assure the correct working of the apparatus.

This is the case, for example, of the known pipe fittings with check-valve and release device, in which the valve must be obviously brought into closed position before the operation of the release device.

For the correct sequential operation of the two controlled members, therefore, there is usually provided a device which through links of various kind causes the operation of a second controlled member to depend on the performed operation of the first.

Naturally it is important that anomalous workings can't anyway verify, which modify the wanted sequence or perhaps cause different final conditions of the controlled members.

The object of the present invention is to realize a sequential operation device for controlled members, which is exact and sure in working.

According to the invention such an object is reached by a device characterized in that it comprises an operation member which can be driven to advance along a rectilinear path, which is perpendicular and laterally positioned with respect to a rotating control shaft of a first controlled member and directed towards a control element of a second controlled member, and movement transmission means operatively interposed between said operation member and said rotating shaft so that an initial advancement of said operation member along said path is able to cause a rotation of said shaft from a first angular position to a second angular position for the operation of said first controlled member, said transmission means being provided with such a clearance as to allow said operation member a further final advancement, with the shaft being stationary in said second angular position, for the displacement of said control element from an initial rest position to a final position of operation of said second controlled member.

In other words, the device according to thee invention is therefore made in such a way that not only the exact sequence of operations of the first and, then, of the second controlled member is assured, but the first controlled member is also prevented from a possible removal from the wanted final position during the last advancement step of the operation member, that is during the operation step of the second controlled member. This is obtained by means of a movement transmission provided with clearance which not only obliges the rotating shaft to rotate during the initial advancement step of the operation member, but, by making use of the above mentioned clearance, allows the same shaft to remain in the reached position during the final advancement step of the same operation member. The first controlled member can thus be kept in the controlled position, while the operation of the second controlled member is taking place.

The features of the present invention will be made more evident by the following description of some embodiments thereof, which are illustrated by way of example in the enclosed drawings, in which:

FIG. 1 shows, at rest, a device according to the invention as used for the sequential operation of the check-valve and of the release device of a pipe fitting;

FIG. 2 shows the same device at the end of the initial advancement step of the operation member;

FIG. 3 shows the same device at the end of the final advancement step of the operation member;

FIG. 4 shows an enlarged detail of said device, in section along line IV—IV of FIG. 1;

Figure 5:
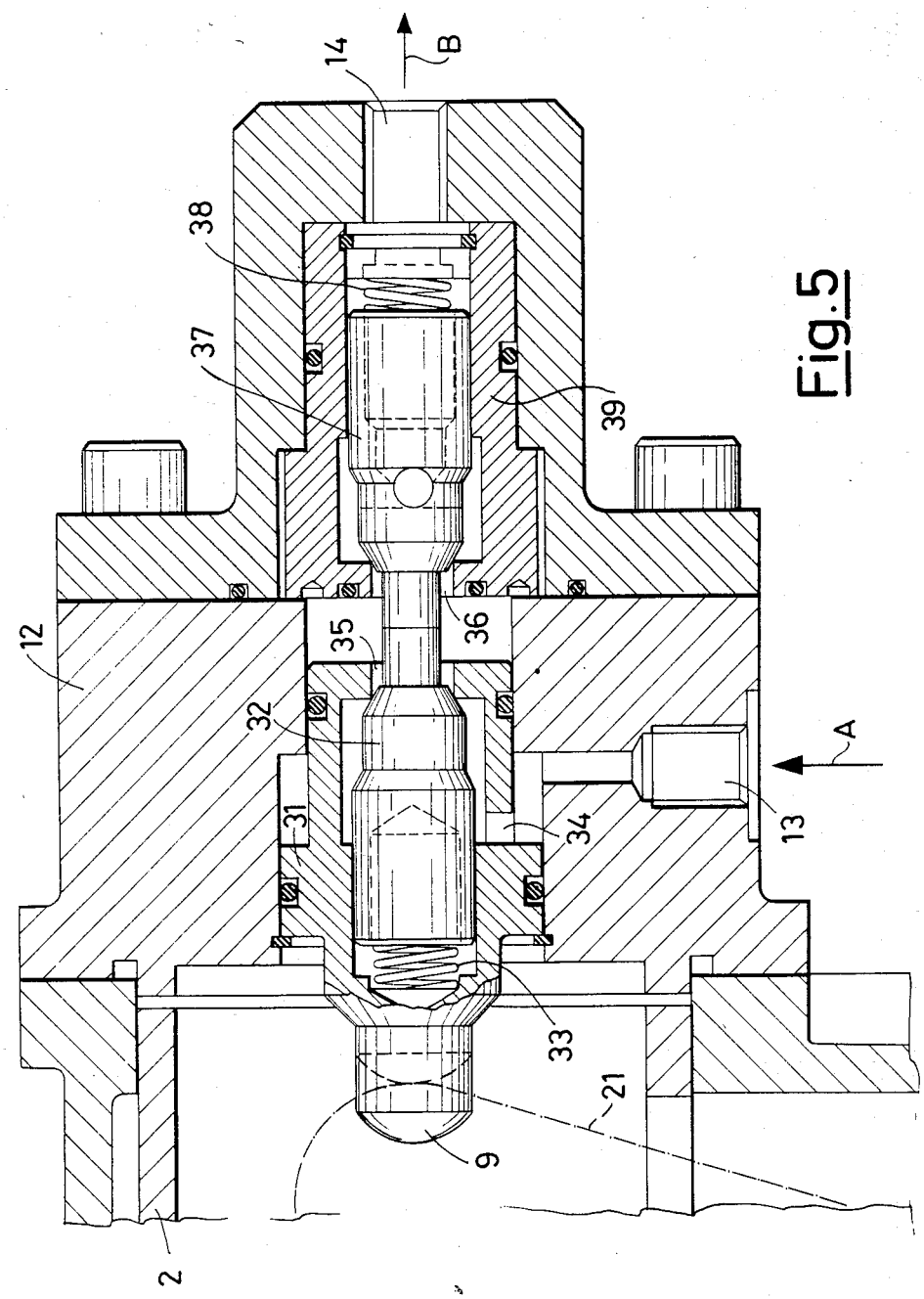
FIG. 5 shows a detail of a modified embodiment of the device illustrated in the previous Figures.

With reference to FIGS. 1-4, the device illustrated herein comprises an operation member 1, realized in the form of a hollow piston, which is slidingly housed in a cylindrical chamber 2 and can be controlled to advance (and to return back) with rectilinear movement from one end to the other of said chamber. For the control of said advancement there is provided a piston 3 slidingly housed in an oleodynamic cylinder 4 with end ports 5 and 6 and provided with a long stem 7 fixed to the operation member 1.

The advancement path of the operation member 1 is perpendicular and laterally positioned with respect to a rotating shaft 8 destined for the control of a first controlled member constituted, by way of example, by the check-valve of a pipe fitting. The above mentioned path at the same time is directed towards the projecting end 9 of a stem 10 fixed to a piston 11, which is slidingly housed in an oleodynamic cylinder 12 with end ports 13 and 14 and constitutes an hydraulic element destined for the control of a second controlled member constituted, by way of example, by the control cylinder 15 of the release device of the same pipe fitting. In FIG. 1 there is shown how a control electric valve 16 and a cut-off valve 17 are interposed between end ports 18 and 19 of the cylinder 15 and the end ports 13 and 14 of the cylinder 12 for the objects which will be clarified later on.

Between the operation member 1 and the rotating shaft 8 there are interposed movement transmission means, which comprise a forked lever 20 rigidly connected to the shaft 8 and extending transversally from it and a connecting rod 21 having one end pivoted at 23 with the corresponding end of the lever 20. As better shown in FIG. 4, the pivotment realized at 23 between the connecting rod 21 and the lever 20 provides for a certain transversal clearance, whose objects will be clarified by the following description of the working manner of the device.

Starting from the rest position of FIG. 1, in which the check-valve controlled by the shaft 8 is open and the release device controlled by the cylinder 15 is in gripping condition, an initial advancement of the piston 3 and consequently of the operation member 1 up to the intermediate position of FIG. 1 causes through the connecting rod 21 and the lever 20 a corresponding rotation of 90° of the rotating shaft 8 for the consequent closure of the check-valve controlled by it, that is, more generally, for the operation of the first controlled member.

A further final advancement of the piston 3 and of the operation member 1 allows then the connecting rod 21 to reach and to engage (FIG. 3) the projecting end 9 of the stem 10 of the piston 11, which, by moving inside the cylinder 12, forces the oil contained in its right-hand part (looking at FIGS. 1, 2 and 3) to go out of the cylinder 12 through the port 14 and to enter the cylinder 15 through the port 19, while return oil flows from the cylinder 15 to the cylinder 12 through the port 18, the electric valve 16 and the port 13. It is thus caused also, after the check-valve closure, the operation of the cylinder 15 for the corresponding operation of the release device, that is, more generally, for the operation of the second controlled member.

It is important to note that during the above mentioned final advancement of the operation member 1 the connecting rod 21 inclines with respect to the lever 20 without causing the contrary rotation of this latter, whose rotation would obviously cause an indesirable partial opening of the check-valve. This is due to the transversal clearance existing between the connecting rod 21 and the lever 20 at the pivot 23, which clearance allows substantially the mutal moving away of the axes of the pivots 22 and 23, which is necessary, as already said, to allow the connecting rod 21 to incline while leaving stationary the lever 20 and consequently the shaft 8. The final consequence is that it is assured not only the desired sequential operation of the two controlled members, firstly for the closing of the check-valve and then for the operation of the release device, but also the maintenance of the first controlled member, that is of the check-valve, in the right final position during the operation step of the second controlled member, that is of the release device and up to the end thereof. The wanted sequence is thus respected from the beginning to the end, determining with absolute reliability the perfect operation of the controlled members.

On the other hand, it is to be noted that it is possible to separate functionally the two controlled members, by closing for this purpose the cut-off valve 17, and naturally by connecting the port 14 to discharge. In such case, the advancement of the piston 3 and of the operation memeber 1 only causes (from FIG. 1 to FIG. 2) the closure of the check-valve associated to the shaft 8, while no control is given to the release device during the last advancement step (from FIG. 2 to FIG. 3).

For the return of the device and the relative controlled members it is firstly provided the commutation of the electric valve 16 for the oil feed into the port 18 of the cylinder 15 for the contrary operation of the release device and the contemporaneous coming back of the piston 11 and then the oil feed into the port 6 of the cylinder 4 for the coming back of the piston 3 and consequently of the operation member 1. By so doing, firstly the connection rod 21 moves again to the perpendicular position of FIG. 2 and then both the connecting rod 21 and the lever 20 rotate integrally to move again to the position of FIG. 1.

FIG. 5 relates to a variation of the device of FIGS. 1-4, in which, as hydraulic control element for the second controlled member, the piston 11 with stem 10 is replaced by a sliding hollow body 31 housing a first valve body 32 stressed by a spring 33 in a position of closure of the communication between two ports 34 and 35 respectively communicating with the port 13 and with a front port 36 obtained in a fixed hollow body 39 and communicating with the port 14 under the control of a second valve body 37 stressed in closed position by a spring 38.

Because of this new structure of the hydraulic control element of the second controlled member, the final advancement of the operation member 1 causes through the connecting rod 21 cooperating with the projecting end 9 an advancement of the hollow body 31 for the opening of the communication between the ports 34 and 35. The oil fed to the port 13 (arrow A) can thus act on the valve body 37 to cause the opening of the communication between the ports 36 and 14 and thus to allow the oil discharge through the port 14 (arrow B). It is thus established an oil flow between the port 13 and the port 14, which can be used for the control of a second controlled member, once again after the second operation member 1 has caused through the connecting rod 21 and the lever 20 the operation of the first controlled member and, thanks to the clearance around the pivot 23, without the displacement of the second controlled member from the reached position as a result of the final advancement of the operation member 1.

The device illustrated in FIGS. 6-10 basically does not differ from that of FIGS. 1-4, possibly with the variation of FIG. 5, nevertheless it provides a different solution for the connection with clearance between the operation member 1 and the rotating shaft 8. Besides this latter is provided with an independent operation member and the control element of the second controlled member is of mechanical instead of hydraulic kind.

Figure 10:
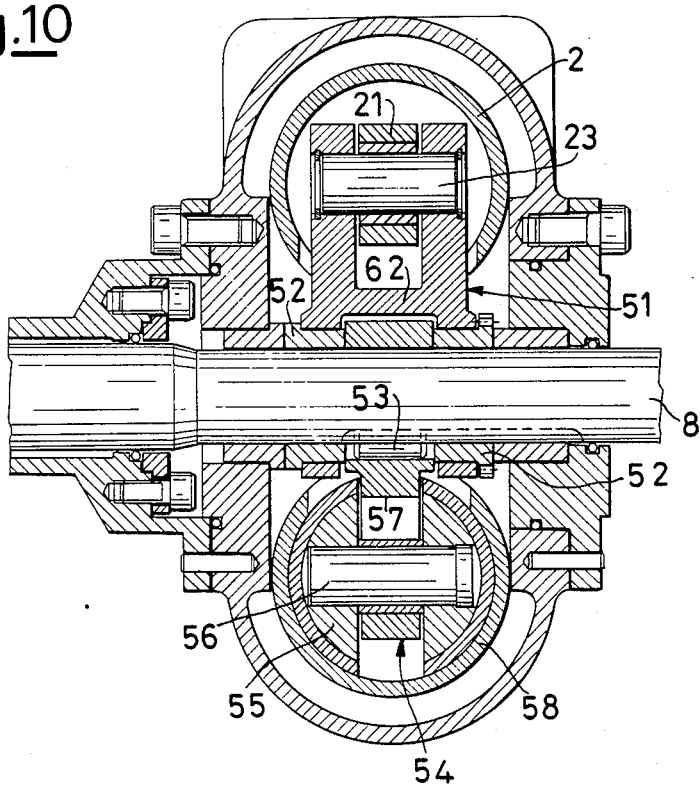
FIG. 10 shows this last device in section along line X—X of FIG. 6.

Going into greater details, the connecting rod 21 with relative pivots 22 and 23 substantially connects without clearance the sliding operation member 1 with a forked lever 51, which is mounted on the shaft 8 in a freely rotating way, by means of bushes 52, as shown in FIG. 10.

Figure 6:
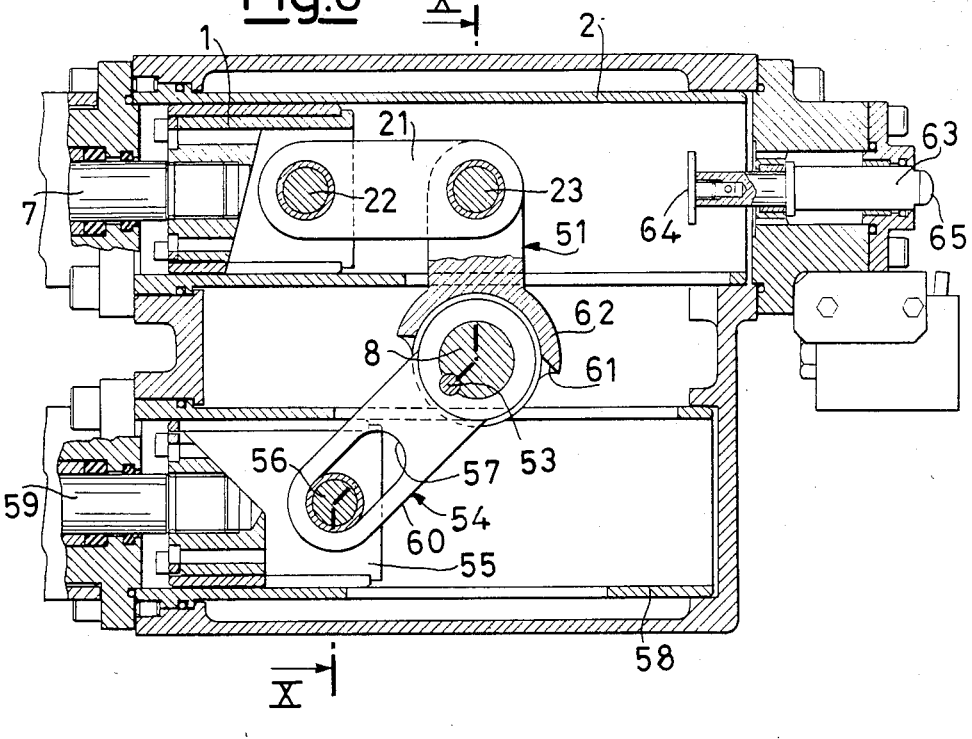
FIGS. 6–9 show, in different operative conditions, a further embodiment of the device according to the invention.
Figure 7:
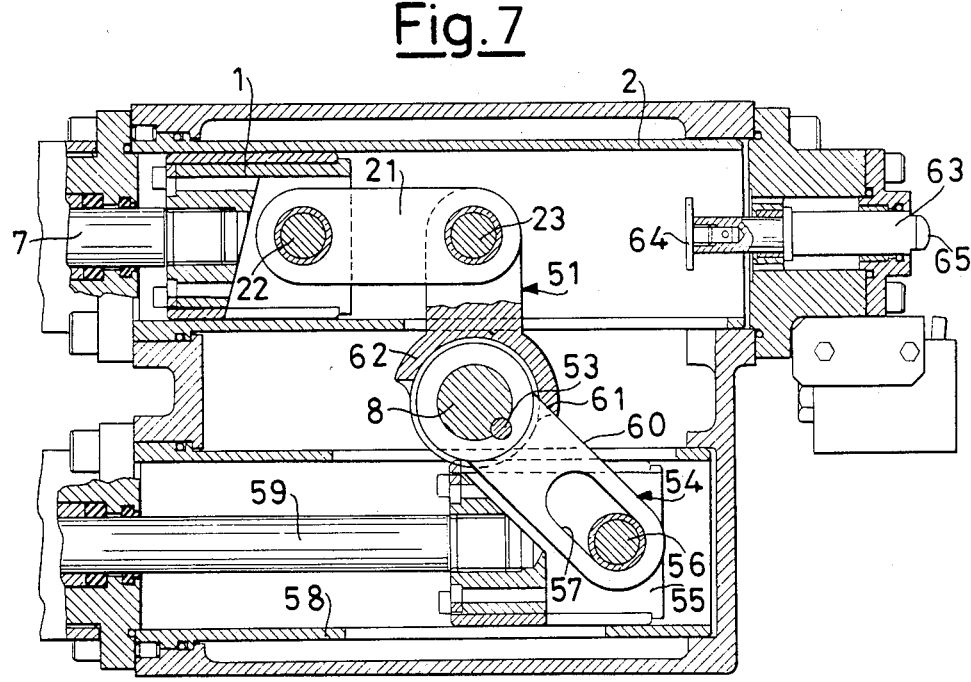
Figure 8:
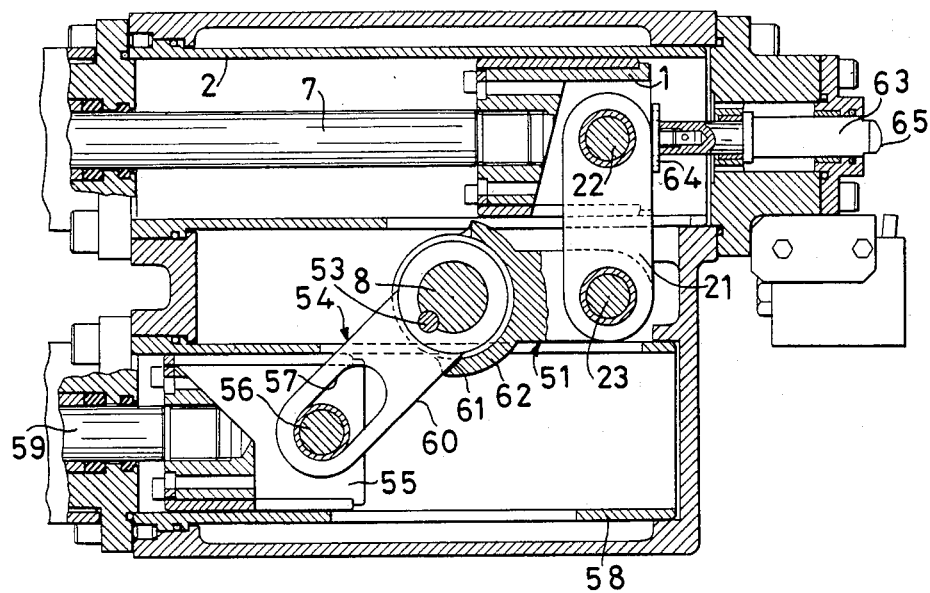
Figure 9:
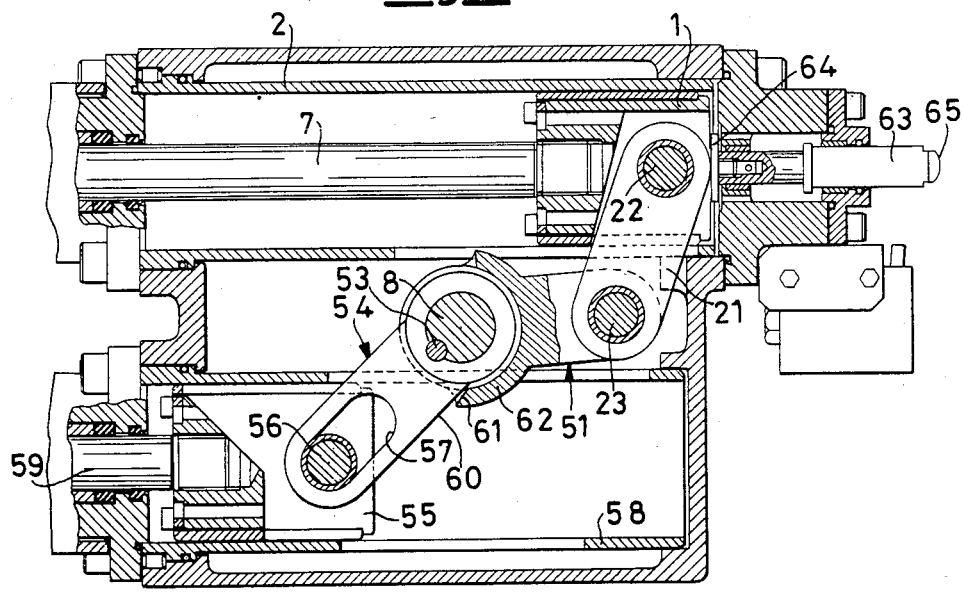

On the shaft 8 it is on the contrary rigidly fixed by means of a key 53 a further lever 54, which is movable from the one to the other of the positions illustrated in FIGS. 6 and 7 by means of a further operation member 55, to which the lever 54 is coupled by means of a pivot 56 slidingly housed in an elongated eyelet 57 of the lever 54. Said operation member 55 is slidingly housed in cylindrical chamber 58 parallel to the chamber 2 and is driven to move by a respective piston (not shown) to which the member 55 is connected through a stem 59.

Between the two levers 51 and 54, the first one freely rotating on the shaft 8 and the second one rigidly fixed on it, however, doesn't exist only the complete movement freedom deriving from their different coupling to the shaft 8, but also a rotational link represented by the abutment engagement realizable between a lateral edge 60 of the lever 54 and a shoulder of the mounting head 62 of the lever 51 (FIGS. 6 and 7). Such abutment engagement is determinant for the required sequential movement, as it will be better explained later on.

As a control of the second controlled member, it is finally employed a simple sliding stem 63, which has at one end a cap 64 inserted in the chamber 2 and engageable by the connecting rod 21 at the end of the advancement movement of the operation member 1 (FIGS. 8 and 9) and at the other end a rounded head 65 able to act mechanically on the second controlled member, by way of example on the control member of the release device of the pipe fitting, whose check-valve is operated by the rotating shaft 8.

As a result of the above described structural variations, the device of FIGS. 6-10 provides also corresponding functional changes.

First of all, it is possible to control, through the operation member 55, the sole rotation of the shaft 8 from the angular position of FIG. 6 to that of FIG. 7, and viceversa, for the corresponding operation of the first controlled member (in the considered example, respectively, for the opening and closure of the check-valve), leaving on the contrary stationary in rest position (FIGS. 6 and 7) the operation member 1 and therefore the second controlled member (in the considered example, the release device).

At the same time, it remains the possibility of subjecting the operation of the second controlled member to that of the first one, or better to the reaching, by the first controlled member, of a required operative condition such as that of the closure of the check-valve of the fitting. In fact, supposing that at the beginning of the operation the device is in the condition of FIG. 7, that is with the shaft 8 in the angular position corresponding to the opening state of the valve and the sliding stem 63 maintained (by an elastic element acting thereon or by the same second controlled member) in a position in which the release device is not operated, the abutment engagement between the shoulder 61 of the lever 51 and the lateral edge 60 of the lever 54 allows the initial advancement of the operation member 1 towards the sliding stem 63 to cause a rotation of the shaft 8 from the angular position of FIG. 7 to that of FIG. 8 with consequent closing of the check-valve of the fitting. The successive final advancement of the same operation member, on the other hand, can cause the coming back of the sliding stem 63 (FIG. 9) for the consequent operation of the release device, without the cinematic connection formed by the connecting rod 21 and the lever 51 causes a contrary partial rotation of the shaft 8 and therefore a partial opening of the check-valve. The rotating assembly of the lever 51 on the shaft 8 allows in fact the same lever 51 to rotate in opposite direction to such an extent to compensate the inclination of the connecting rod 21 (FIG. 9), in the meantime leaving stationary the shaft 8. At the end of the stroke, it has thus been verified the desired sequence of operations of the two controlled members, that is the complete closure of the check-valve and the successive operation of the release device.

I claim:

1. A sequential operation device for controlled members, comprising an operation member which can be driven to advance along a rectilinear path, which is perpendicular and laterally positioned with respect to a rotating control shaft of a first controlled member and directed towards a control element of a second controlled member, and movement transmission means operatively interposed between said operation member and said rotating shaft so that an initial advancement of said operation member along said path is able to cause a rotation of said shaft from a first angular position to a second angular position to effect the operation of said first controlled member, said transmission means having a clearance operative to allow said operation member a further final advancement, while the shaft is stationary in said second angular position, to effect the displacement of said control element from an initial rest position to a final position to effect operation of said second controlled member, said transmission means including a first lever mounted on said shaft in a freely rotating way, a connecting rod interposed between said operation member and said first lever, a second lever rigidly connected to said shaft and connected to a further independent control operation member, and cooperating abutment means provided on said levers so that the rotation of said first lever during said initial advancement of said operation member causes, if said shaft is in said first angular position, the contemporaneous rotation of said second lever and said shaft to said second angular position.

2. Device according to claim 1, characterized in that said cooperating abutment means are constituted by a shoulder of said first lever and by a lateral edge of said second lever.

3. Device according to claim 1, characterized in that said further operation member can be driven to move along a rectilinear path parallel to that of said first mentioned operation member.

4. Device according to claim 1, characterized in that said control element is constituted by a piston sliding in a hydraulic cylinder with end ports and provided with a stem with one end engageable by said operation member during said final advancement of the same operation member.

5. Device according to claim 1, characterized in that said control element comprises a hollow body sliding in a cylinder with end ports and provided with a back end engageable by said operation member during said final advancement of the same operation member, said hollow body slidingly housing a first valve body elastically stressed backwards in a position of closure of the communication between a first lateral port communicating with one of said end ports and a front port communicating with a confronting back port of a fixed hollow body which confronts said sliding hollow body, said fixed hollow body slidingly housing a second valve body elastically stressed backwards in a position of closure of the communication between said back port and the other one of said end ports.

6. Device according to claim 1, characterized in that said control element is constituted by a sliding stem, one end of which is positioned for the engagement with said operation member during said final advancement of the same operation member and the other end is positioned for the operation engagement with said second controlled member.

* * * * *